US 12,111,845 B2

United States Patent
Yerfule et al.

(10) Patent No.: US 12,111,845 B2
(45) Date of Patent: Oct. 8, 2024

(54) BACKUP FEATURE PROVIDED BY BIDIRECTIONAL SYNCHRONIZED CONTENT MANAGEMENT SYSTEM

(71) Applicant: Dropbox, Inc., San Francisco, CA (US)

(72) Inventors: Sourabh Yerfule, Sunnyvale, CA (US); Kelson Reiss, San Francisco, CA (US); Jordi Paris Ferrer, San Francisco, CA (US); Adam Arbree, Fairfax, CA (US); Geoffry Song, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 44 days.

(21) Appl. No.: 17/490,225

(22) Filed: Sep. 30, 2021

(65) Prior Publication Data

US 2023/0094648 A1 Mar. 30, 2023

(51) Int. Cl.
*G06F 16/00* (2019.01)
*G06F 11/14* (2006.01)
(Continued)

(52) U.S. Cl.
CPC ........ *G06F 16/275* (2019.01); *G06F 11/1451* (2013.01); *G06F 11/1469* (2013.01);
(Continued)

(58) Field of Classification Search
CPC .. G06F 16/275; G06F 16/252; G06F 11/1451; G06F 11/1469; G06F 2201/80; G06F 2201/82
(Continued)

(56) References Cited

U.S. PATENT DOCUMENTS

| 7,788,352 B2 | 8/2010 | Breuer et al. |
| 8,825,597 B1 * | 9/2014 | Houston ................. G06F 16/10 |
| | | 707/625 |

(Continued)

FOREIGN PATENT DOCUMENTS

| CN | 101102311 B * | 4/2012 |
| WO | 2005029363 A1 | 3/2005 |
| WO | 2012166443 A1 | 12/2012 |

OTHER PUBLICATIONS

Dropbox, "Backing up and syncing from external HD to the Dropbox folder issues" (https://www.dropboxforum.com/t5/Apps-and-Installations/Backing-up-and-syncing-from-external-HD-to-the-Dropbox-folder/td-p/305453), Oct. 25, 2018, 7 pages.*

(Continued)

*Primary Examiner* — Monica M Pyo
(74) *Attorney, Agent, or Firm* — Polsinelli PC

(57) ABSTRACT

The present technology is directed to providing a backup service utilizing a bi-directional synchronization architecture. In order to support both a backup service and a bi-directional synchronization service, the present technology can utilize a special object called an anchor that only permits unidirectional synchronization. Additionally, the present technology separates the backup service from the bi-directional synchronization service. This separation includes utilizing a separate backup directory and bi-directional synchronization directory on a client device, which in turn benefits from the use of a separate instance of the synchronization service on the client device. Further, at the content management system various steps are taken to separate the backup directory from the bi-directional synchronization directory to ensure no objects from the backup directory appear in a user interface related to bi-directional synchronization, and vice versa.

13 Claims, 10 Drawing Sheets

(51) Int. Cl.
    *G06F 16/25*     (2019.01)
    *G06F 16/27*     (2019.01)
(52) U.S. Cl.
    CPC ........ *G06F 16/252* (2019.01); *G06F 2201/80* (2013.01); *G06F 2201/82* (2013.01)
(58) Field of Classification Search
    USPC ........................................................ 707/612
    See application file for complete search history.

(56) References Cited

U.S. PATENT DOCUMENTS

| | | | |
|---|---|---|---|
| 2012/0311280 A1* | 12/2012 | Schmidt | G06F 11/1435 |
| | | | 711/E12.103 |
| 2015/0074044 A1* | 3/2015 | Metreveli | G06F 16/24552 |
| | | | 707/769 |
| 2018/0189250 A1* | 7/2018 | Lee | G06F 40/166 |
| 2018/0189292 A1* | 7/2018 | Grace, Jr. | G06F 16/24578 |
| 2018/0336196 A1* | 11/2018 | Garg | H04L 67/1097 |
| 2019/0095455 A1* | 3/2019 | Barreto | G06F 11/1471 |
| 2019/0208014 A1* | 7/2019 | Goldberg | G06F 3/0629 |
| 2021/0200720 A1* | 7/2021 | Ramabhadran | H04L 67/306 |
| 2022/0121624 A1* | 4/2022 | Yerfule | H04L 67/1095 |

OTHER PUBLICATIONS

Jay, "Using Dropbox as an online backup only" (https://www.dropboxforum.com/t5/Storage-Space/Using-Dropbox-as-an-online-backup-only/td-p/255759), Dec. 7, 2017, 9 pages.*

* cited by examiner

BACKUP FEATURE PROVIDED BY BIDIRECTIONAL SYNCHRONIZED CONTENT MANAGEMENT SYSTEM

TECHNICAL FIELD

The present technology pertains to a backup service for maintaining a backup of objects on a disk or in a directory, and more specifically pertains to providing the backup service by, or with, a bidirectional synchronization service.

BACKGROUND

For as long as there have been digital files, there have been mechanisms to back up those files. Whether back up DVDs, USB hard drives, disc redundancy (RAID) and/or cloud backups, people have relied on mechanisms to back up their digital objects. More recently, services that provide access to digital objects in the cloud for modification by an accessing device, or synchronization services that provide access to objects on any device with a synchronization agent have become popular.

DETAILED DESCRIPTION

Figure 1:
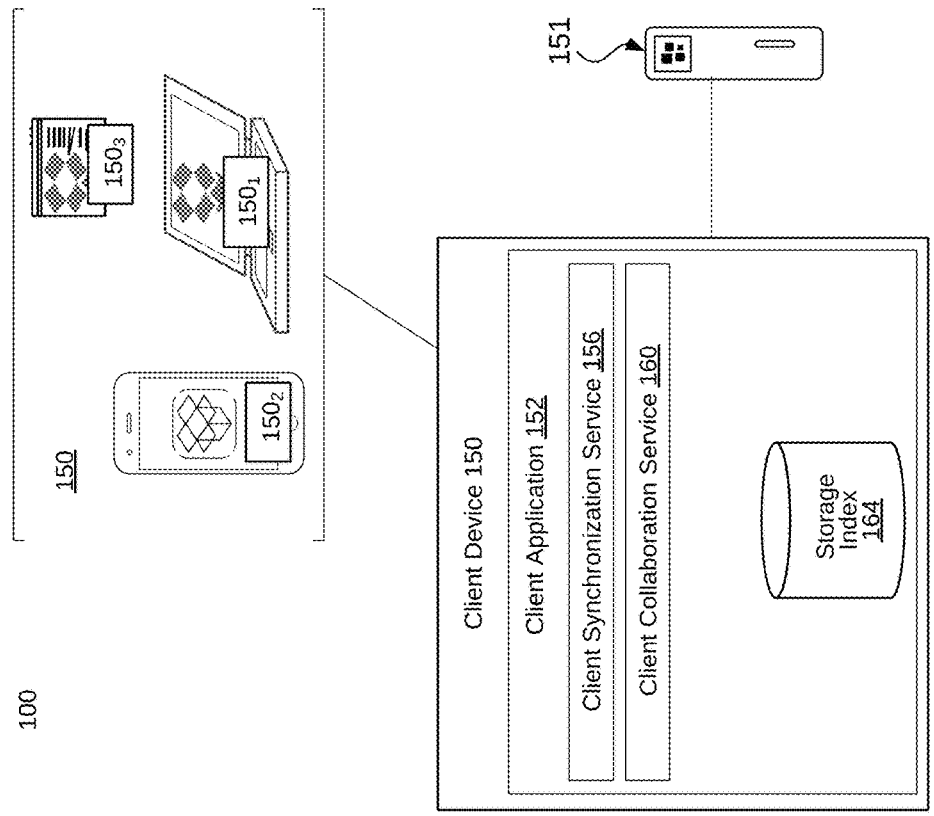
FIG. 1 illustrates an example of a content management system and client devices in accordance with some aspects of the present technology.
Figure 1:
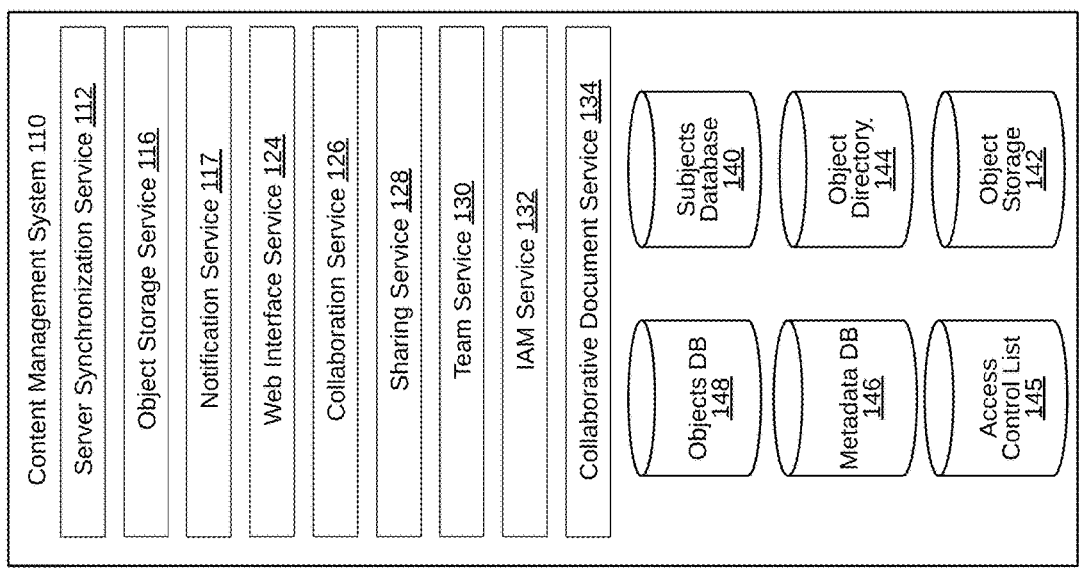

As services that provide access to digital objects in the cloud for modification by an accessing device have become popular, a growing demand has appeared for true backup services. While cloud-based storage or synchronization services ostensibly perform the core function of a backup service, many users find these services to be unsatisfactory for their backup needs. At the same time, users have become comfortable with these cloud-based storage or synchronization services and want these services to provide a true backup service along with their other offerings.

Cloud-based storage or synchronization services often maintain a copy of all of a user's digital objects (or at least objects to which the user has given the service access), and thus provides a backup copy of those objects. Many such services also provide features that allow a user to find a copy of an object that existed at a past date, which makes it so objects that have been modified over time can have iterative versions backed-up. However, some cloud-based storage or synchronization services allow objects to be shared and modified by multiple different users. Such services also allow the digital objects to be modified from many different devices. However, this ease of access and modification is contrary to the concept of a backup service where users expect copies of objects to be more static. At a minimum, users expect the location to be backed up to be a source of truth for the versions of the objects and therefore any service that allows objects to be modified from other sources is inconsistent with a backup service.

The infrastructure of current cloud-based storage or synchronization services is highly developed and optimized for copying objects from one location to another. Accordingly, it is desirable to use the trusted infrastructure of cloud-based storage or synchronization services to provide a backup service, but some modifications need to be made to allow the backup service to function as users desire. Accordingly, the present technology is directed to modifying the existing infrastructure of cloud-based storage or synchronization services to provide a backup service.

Additionally, service providers providing cloud-based storage or synchronization services are well equipped to provide a backup service that meets users' needs, but certain problems need to be solved. For example, the synchronization service and backup service need to have different behaviors germane to the respective type of services. As noted above, there are challenges related to utilizing the synchronization infrastructure to provide the backup service. Additionally, when the same service provider would be providing both types of services, there are challenges related to providing separate user interfaces for each service without confusing a user. For example, a user will expect to be able to make changes to objects in the synchronization service, but not objects in the backup service. The user interface will need to provide separation between the types of services. The present technology is directed to solving such problems.

The present technology is directed to providing a backup service utilizing a bi-directional synchronization architecture. In order to support both services, the present technology can utilize a special object called an anchor that can be configured to only permit unidirectional synchronization. Additionally, the present technology separates the backup service from the bi-directional synchronization service. This separation includes utilizing a separate backup directory and bi-directional synchronization directory on a client device, which in turn benefits from the use of a separate instance of the synchronization service on the client device. Further, at the content management system various steps are taken to separate the backup directory from the bi-directional synchronization directory to ensure no objects from the backup directory appear in a user interface related to bi-directional synchronization, and vice versa.

Accordingly, the present technology provides a variety of benefits. For example, the present technology provides the benefit of a modified version of trusted synchronization technology to provide a backup service that is reliable and efficient.

Another benefit is that the present technology permits a synchronization service to monitor two separate directories. The main reason for doing so is to keep a collection of objects to be backed up completely separate from objects to be synchronized, but the technology could also be used to synchronize two different user accounts that are otherwise segregated.

Another benefit of the present technology is to provide improved user interfaces. The backup objects and the synchronization objects are kept separate at every user interface. For example, regardless of whether a file system is being browsed by a native file system browser germane to a client device or being viewed through a user interface provided by the content management system, the backed-up directory is clearly distinction from the synchronized directory. Although both directories might be associated with the same user account at the content management system, a user will see an interface that matches their expectations for the service that applies to particular directory. For example, a user will not see any synchronization or sharing options from within the backup service.

Another benefit of the present technology is that a backup can be directly restored to its original location. Most backup services can allow a user to download backed-up objects, but such services cannot restore the backup-up directory. Since the present technology utilizes a bi-directional synchronization engine that has been configured to operate in a uni-directional manner, the present technology can take advantage of the native bi-directional functionality of the synchronization engine in the limited circumstance that a user wants to restore an object or an entire directory. In such instances, the present technology can restore the object directly to its location on the client device without requiring the user to manually download a copy and save it back to its original location.

Another benefit is that efficiencies are gained by leveraging the present technology to provide backup services and synchronization services. For example, the two services can be configured to adjust bandwidth usage to prioritize bandwidth for synchronization and deprioritize bandwidth for backup since synchronized objects are more likely to be needed sooner and more frequently. In another example, less disk and memory is needed by the combined services than utilizing two completely independent services. Furthermore, the combined services can permit synchronized objects to be moved to the backup service, or move backed-up objects to the synchronization service if desired.

These are just some of the benefits provided by the present technology and should not be considered a complete list of all benefits.

In some embodiments, the disclosed technology is deployed in the context of a content management system having object synchronization capabilities, object backup capabilities, and collaboration features, among others. An example system configuration 100 is shown in FIG. 1, which depicts content management system 110 interacting with a client device 150.

Accounts

Content management system 110 can store objects in association with accounts, as well as perform a variety of object management tasks, such as retrieve, modify, browse, and/or share the object(s). Furthermore, content management system 110 can enable an account to access object(s) from multiple client devices.

Content management system 110 supports a plurality of accounts. A subject (user, group, team, company, etc.) can create an account with content management system 110, and account details can be stored in subject database 140. Subject database 140 can identify a registered subject by a subject ID, and store profile information for registered subjects in association with the subject ID. In some cases, profile information for registered subjects includes a subject name and/or email address. Subject database 140 can include account management information, such as account type (e.g., various tiers of free or paid accounts), storage space allocated, storage space used, client devices 150 having a registered content management client application 152 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 140 need not store complete information associated with an account for a subject. Some portion of information associated with an account for a subject can also be stored in another database of content management system 110 such as metadata database 146, or in a database external to content management system 110.

Subject database 140 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 140 can be broken into a plurality of tables, indexes and other data structures.

Object Storage

A feature of content management system 110 is the storage of objects, which can be stored in object storage 142. An object generally is any entity that can be recorded in a file system. Objects can be any object including digital data such as documents, collaboration objects, text files, audio files, image files, video files, webpages, executable files, binary files, directories, folders, zip files, playlists, albums, etc.

In some embodiments, objects can be grouped into a collection, which can refer to a folder including a plurality of objects, or a plurality of objects that are related or grouped by a common attribute.

In some embodiments, object storage 142 is combined with other types of storage or databases to handle specific functions. Object storage 142 can store objects, while metadata regarding the objects can be stored in metadata database 146. Likewise, data regarding where an object is stored in object storage 142 can be stored in content directory 144. Additionally, data regarding changes, access, etc. can be stored in object database 148. Object database 148 can also include a subject account identifier that identifies the subject IDs that have access to the object.

In some embodiments, object database 148 can be broken into a plurality of tables, indexes and other data structures.

Each of the various storages/databases such as object storage 142, content directory 144, object database 148, and metadata database 146 can be comprised of more than one such storage or database and can be distributed over many devices and locations. Other configurations are also possible. For example, data from object storage 142, content directory 144, object database 148, and/or metadata database 146 may be combined into one or more object storages or databases or further segmented into additional object storages or databases. Thus, content management system 110 may include more or less storages and/or databases than shown in FIG. 1.

In some embodiments, object storage 142 is associated with at least one object storage service 116, which includes software or other processor executable instructions for managing the storage of objects including, but not limited to, receiving objects for storage, preparing objects for storage, selecting a storage location for the object, retrieving objects from storage, etc. In some embodiments, object storage service 116 can divide an object into smaller chunks for storage at object storage 142. The location of each chunk making up an object can be recorded in content directory 144. Content directory 144 can include a content entry for each object stored in object storage 142. The content entry can be associated with an object ID, which identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 116 can output a unique hash for each different version of an object.

Object storage service 116 can also designate or record a content path for an object in object database 148. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived.

While objects are stored in object storage 142 in blocks and may not be stored under a tree like directory structure, such directory structure is a comfortable navigation structure for subjects. Object storage service 116 can define or record a content path for an object wherein the "root" node of a directory structure can be any directory with specific access privileges assigned to it, as opposed to a directory that inherits access privileges from another directory.

In some embodiments, a root directory can be mounted underneath another root directory to give the appearance of a single directory structure. This can occur when an account has access to a plurality of root directories. However, such as in the case when content management system 110 provides a backup service and a synchronization service, a root directory for the backup service might not be mounted within a root directory of a synchronization service since permissions and behavior of the two directories are different and not compatible. As addressed above, the directory structure is merely a comfortable navigation structure for subjects, but does not correlate to storage locations of objects in object storage 142.

While the directory structure in which an account views objects does not correlate to storage locations at content management system 110, the directory structure can correlate to storage locations on client device 150 depending on the file system used by client device 150.

As addressed above, a content entry in content directory 144 can also include the location of each chunk making up an object. More specifically, the content entry can include content pointers that identify the location in object storage 142 of the chunks that make up the object.

Object storage service 116 can decrease the amount of storage space required by identifying duplicate objects or duplicate blocks that make up an object or versions of an object. Instead of storing multiple copies, object storage 142 can store a single copy of the object or block of the object and content directory 144 can include a pointer or other mechanism to link the duplicates to the single copy.

Object storage service 116 can also store metadata describing objects, object types, folders, file paths, and/or the relationship of objects to various accounts, collections, or groups in metadata database 146, in association with the object ID of the object.

Object storage service 116 can also store a log of data regarding changes, access, etc. in object database 148. Object database 148 can include the object ID of the object and can optionally include a description of the change or access action along with a time stamp or version number and any other relevant data. Object database 148 can also include pointers to blocks affected by the change or object access. Object storage service can provide the ability to undo operations, by using an object version control that tracks changes to objects, different versions of objects (including diverging version trees), and a change history that can be acquired from object database 148.

Object Synchronization

Another feature of content management system 110 is the synchronization of objects with at least one client device 150. Client device(s) can take different forms and have different capabilities. For example, client device 150-1 is a computing device having a local file system accessible by multiple applications resident thereon. Client device 150-2 is a computing device wherein objects are only accessible to a specific application or by permission given by the specific application, and the objects are typically stored either in an application specific space or in the cloud. Client device 150-3 is any client device accessing content management system 110 via a web browser and accessing objects via a web interface. While example client devices 150-1, 150-2, and 150-3 are depicted in form factors such as a laptop, mobile device, or web browser, it should be understood that the descriptions thereof are not limited to devices of these example form factors. For example, a mobile device such as client 150-2 might have a local file system accessible by multiple applications resident thereon, or client 150-2 might access content management system 110 via a web browser. As such, the form factor should not be considered limiting when considering client 150's capabilities. One or more functions described herein with respect to client device 150 may or may not be available on every client device depending on the specific capabilities of the device—the file access model being one such capability.

In some embodiments, client device 150 can be communicatively connected to an external hard drive 151.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a client synchronization service 156.

Client synchronization service 156 can be in communication with server synchronization service 112 to synchronize changes to objects between client device 150 and content management system 110.

Client device 150 can synchronize content with content management system 110 via client synchronization service 156. The synchronization can be platform agnostic. That is, content can be synchronized across multiple client devices of varying types, capabilities, operating systems, etc. Client synchronization service 156 can synchronize any changes (new, deleted, modified, copied, or moved objects) to objects in a designated directory of a file system of client device 150 that is monitored by synchronization service 156.

In some embodiments, client synchronization service 156 is a bi-directional synchronization service whereby objects can be synchronized from client device 150 to content management system 110, and vice versa. In embodiments wherein synchronization is from client device 150 to content management system 110, a subject can manipulate objects directly from the file system of client device 150, while client synchronization service 156 can monitor a designated directory on client device 150 for changes to files within the monitored folders.

When client synchronization service 156 detects a write, move, copy, or delete of content in a directory that it monitors, client synchronization service 156 can synchronize the changes to object storage service 116. In some embodiments, client synchronization service 156 can perform some functions of object storage service 116 including functions addressed above such as dividing the object into blocks, hashing the object to generate a unique identifier, etc. Client synchronization service 156 can index content within client storage index 164 and save the result in storage index 164. Indexing can include storing paths plus the object identifier, and a unique client identifier for each object. In some embodiments, client synchronization service 156 learns the object identifier from server synchronization service 112, and learns the unique client identifier from the operating system of client device 150.

Client synchronization service 156 can use storage index 164 to facilitate the synchronization of at least a portion of the objects within client storage with objects associated with a subject account on content management system 110. For example, client synchronization service 156 can compare storage index 164 with content management system 110 and detect differences between content on client storage and content associated with a subject account on content management system 110. Client synchronization service 156 can then attempt to reconcile differences by uploading, downloading, modifying, and deleting content on client storage as appropriate. Object storage service 116 can store the changed or new block for the object and update object database 148, metadata database 146, content directory 144, object storage 142, subject database 140, etc. as appropriate.

When synchronizing from content management system 110 to client device 150, data regarding a mount, modification, addition, deletion, move of an object recorded in object database 148 can trigger a notification to be sent to client device 150 using notification service 117. When client device 150 is informed of the change, client device 150 can make a request for changes listed in object database 148 since the last synchronization point known to the client device. When client device 150 determines that it is out of synchronization with content management system 110, client synchronization service 156 requests object blocks including the changes, and updates its local copy of the changed objects.

In some embodiments, storage index 164 stores tree data structures wherein one tree reflects the latest representation of a directory according to server synchronization service 112, while another tree reflects the latest representation of the directory according to client synchronization service 156. Client synchronization service can work to ensure that the tree structures match by requesting data from server synchronization service 112 or committing changes on client device 150 to content management system 110.

Sometimes client device 150 might not have a network connection available. In this scenario, client synchronization service 156 can monitor the linked collection for object changes and queue those changes for later synchronization to content management system 110 when a network connection is available. Similarly, a subject can manually start, stop, pause, or resume synchronization with content management system 110.

Client synchronization service 156 can synchronize all content associated with a particular subject account on content management system 110. Alternatively, client synchronization service 156 can selectively synchronize some of the objects associated with the particular subject account on content management system 110. Selectively synchronizing only some of the objects can preserve space on client device 150 and save bandwidth.

In some embodiments, client synchronization service 156 selectively stores a portion of the objects associated with the particular subject account and stores placeholder objects in client storage for the remaining portion of the objects. For example, client synchronization service 156 can store a placeholder object that has the same filename, path, extension, metadata, of its respective complete object on content management system 110, but lacking the data of the complete object. The placeholder object can be a few bytes or less in size while the respective complete object might be significantly larger. After client device 150 attempts to access the object, client synchronization service 156 can retrieve the data of the object from content management system 110 and provide the complete object to client device 150. This approach can provide significant space and bandwidth savings while still providing full access to a subject's objects on content management system 110.

In some embodiments, client synchronization service 156 can be utilized to provide a backup service by monitoring a directory selected for backup and providing unidirectional synchronization from the client device to the content management system. In such embodiments, directories indicated for backup can be represented by an anchor object that includes attributes that restrict it to uni-directional synchronization.

In some embodiments, multiple instances of client synchronization service 156 can execute simultaneously. Each instance of client synchronization service 156 can be used to monitor a different directory.

Collaboration Features

Another feature of content management system 110 is to facilitate collaboration between subjects. Collaboration features include object sharing, commenting on objects, co-working on objects, instant messaging, providing presence, and seen state information regarding objects, etc.

Sharing

Content management system 110 can manage sharing objects via sharing service 128. Sharing an object by providing a link to the object can include making the object accessible from any computing device in network communication with content management system 110. However, in some embodiments a link can be associated with access restrictions enforced by content management system 110 and Identity and Access Management (IAM) service 132. Sharing content can also include linking content using sharing service 128 to share content within content management system 110 with at least one additional subject account (in addition to the original subject account associated with the object) so that each subject account has access to the object. The additional subject account can gain access to the content by accepting the content, which will then be accessible through either web interface service 124 or directly from within the directory structure associated with their account on client device 150. The sharing can be performed in a platform-agnostic manner. That is, the content can be shared across multiple client devices 150 of varying types, capabilities, operating systems, etc. The content can also be shared across varying types of subject accounts.

To share an object within content management system 110 sharing service 128 can add a subject ID of a team or of one or more subject accounts with a content item in objects database 148 associated with the object, thus granting the added subject account(s) access to the object. Sharing service 128 can also remove subject IDs from being permitted to access a content item in objects database 148 to restrict a subject account's access to the object. Sharing service 128 can record object identifiers, subject identifiers given access to an object, and access levels in objects database 148. For example, in some embodiments, subject identifiers associated with a single content item can specify different permissions for respective subject identifiers with respect to the associated object.

In some embodiments, content management system 110 can include an access control list 145 which includes a description of complete access rights pertaining to a respective object. An access control list for any respective object in content management system can be derived from objects database 148. In some embodiments, it is not desirable to maintain a persistent access control list 145 for a respective object, as an access control list 145 for a respective object can be derived when needed.

To share objects outside of content management system 110, sharing service 128 can generate a custom network address, such as a uniform resource locator (URL), which allows any web browser to access the object or collection in content management system 110 without any authentication. To accomplish this, sharing service 128 can include content identification data in the generated URL, which can later be used to properly identify and return the requested object. For example, sharing service 128 can include the account identifier and the content path or an object identifying code in the generated URL. Upon selection of the URL, the content identification data included in the URL can be transmitted to content management system 110, which can use the received content identification data to identify the appropriate object and return the object.

In addition to generating the URL, sharing service 128 can also be configured to record in objects database 148 that a URL to the object has been created. In some embodiments, an entry into objects database 148 associated with an object can include a URL flag indicating whether a URL to the object has been created. For example, the URL flag can be a Boolean value initially set to 0 or false to indicate that a URL to the object has not been created. Sharing service 128 can change the value of the flag to 1 or true after generating a URL to the object.

In some embodiments, sharing service 128 can associate a set of permissions to a URL for an object. For example, if a subject attempts to access the object via the URL, sharing service 128 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 128 can also be configured to deactivate a generated URL. For example, each entry into objects database 148 can also include a URL active flag indicating whether the content should be returned in response to a request from the generated URL. For example, sharing service 128 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 128 can reactivate the URL by again changing the value of the URL active flag to 1 or true. A subject can thus easily restore access to the object without the need to generate a new URL.

In some embodiments, content management system 110 can designate a URL for uploading an object. For example, a first subject with a subject account can request such a URL, provide the URL to a contributing subject and the contributing subject can upload an object to the first subject's subject account using the URL.

Team Service

In some embodiments content management system 110 includes team service 130. Team service 130 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Teams service 130 can provide a common shared space for the team, private subject account folders, and access limited shared folders. Teams service can also provide a management interface for an administrator to manage collections and objects within team, and can manage subject accounts that are associated with the team. Teams, sub-teams, subject accounts are all given a subject identifier in subjects database 140, and the membership to teams by subject accounts is also recorded in subjects database 140.

IAM (Identity and Access Management) Service

In some embodiments, content management system 110 includes IAM service 132. IAM service 132 ensures that a subject account attempting to access an object has appropriate rights to access the object. IAM service 132 can receive a token from client application 152 that follows a request to access a namespace and can return the capabilities permitted to the subject account. For subject accounts with multiple levels of access (e.g., a subject account with subject rights and administrator rights) IAM service 132 can also require explicit privilege escalation to avoid unintentional actions by administrators.

Presence and Seen State

In some embodiments, content management system can provide information about how subjects with which an object is shared are interacting or have interacted with the object. In some embodiments, content management system 110 can report that a subject with which an object is shared is currently viewing the object. For example, client collaboration service 160 can notify notifications service 117 when client device 150 is accessing the object. Notifications service 117 can then notify all client devices of other subjects having access to the same object of the presence of the subject of client device 150 with respect to the object.

In some embodiments, content management system 110 can report a history of subject interaction with a shared object. Collaboration service 126 can query data sources such as metadata database 146 and object database 148 to determine that a subject has saved the object, that a subject has yet to view the object, etc., and disseminate this status information using notification service 117 to other subjects so that they can know who currently is or has viewed or modified the object.

Collaboration service 126 can facilitate comments associated with content, even if an object does not natively support commenting functionality. Such comments can be stored in metadata database 146.

Collaboration service 126 can originate and transmit notifications for subjects. For example, a subject can mention another subject in a comment and collaboration service 126 can send a notification to that subject that he has been mentioned in the comment. Various other object events can trigger notifications, including deleting an object, sharing an object, etc.

Collaboration service 126 can provide a messaging platform whereby subjects can send and receive instant messages, voice calls, emails, etc.

Collaboration Objects

In some embodiments, content management service can also include Collaborative document service 134 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects to access an object through a web interface and there they can work on the same copy of the object at the same time.

Collaboration Companion Interface

In some embodiments, client collaboration service 160 can provide a native application companion interface for the purpose of displaying information relevant to an object being presented on client device 150. In embodiments wherein an object is accessed by a native application stored and executed on client device 150, where the object is in a designated location of the file system of client device 150 such that the object is managed by content application 152, the native application may not provide any native way to display the above-addressed collaboration data. In such embodiments, client collaboration service 160 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 142 via an API on behalf of a subject. For example, a software package such as an application running on client device 150, can programmatically make API calls directly to content management system 110 when a subject provides authentication credentials, to read, write, create, delete, share, or otherwise manipulate content.

A subject can view or manipulate content stored in a subject account via a web interface generated and served by web interface service 124. For example, the subject can navigate in a web browser to a web address provided by content management system 110. Changes or updates to content in the object storage 142 made through the web interface, such as uploading a new version of an object, can be propagated back to other client devices associated with the subject's account. For example, multiple client devices, each with their own client software, can be associated with a single account, and objects in the account can be synchronized between each of the multiple client devices.

Client device 150 can connect to content management system 110 on behalf of a subject. A subject can directly interact with client device 150, for example when client device 150 is a desktop or laptop computer, phone, television, internet-of-things device, etc. Alternatively or additionally, client device 150 can act on behalf of the subject without the subject having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the subject can also interact with content management system 110 via a third-party application, such as a web browser, that resides on client device 150 and is configured to communicate with content management system 110. In various implementations, the client-side application 152 can present a subject interface (UI) for a subject to interact with content management system 110. For example, the subject can interact with the content management system 110 via a file system explorer integrated with the file system or via a webpage displayed using a web browser application.

In some embodiments, client application 152 can be configured to manage and synchronize content for more than one account of content management system 110. In such embodiments, client application 152 can remain logged into multiple accounts and provide normal services for the multiple accounts. In some embodiments, each account can appear as folder in a file system, and all objects within that folder can be synchronized with content management system 110. In some embodiments, client application 152 can include a selector to choose one of the multiple accounts to be the primary account or default account.

Third Party Services

In some embodiments content management system 110 can include functionality to interface with one or more third-party services such as workspace services, email services, task services, etc. In such embodiments, content management system 110 can be provided with login credentials for a subject account at the third party service to interact with the third party service to bring functionality or data from those third party services into various subject interfaces provided by content management system 110.

While content management system 110 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
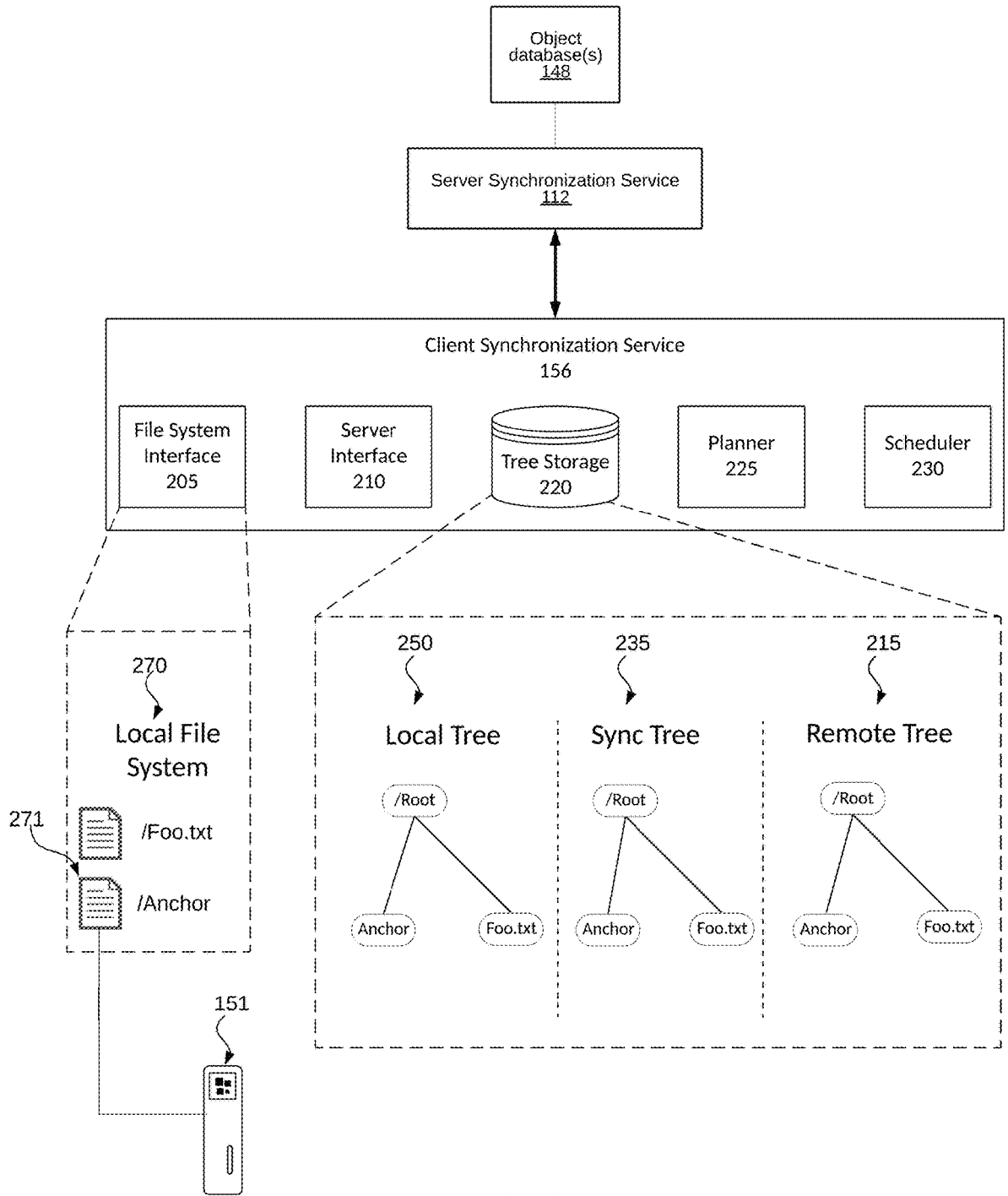
FIG. 2 shows an example of a client synchronization service in accordance with some aspects of the present technology.

FIG. 2 shows an example of a client synchronization service 156, in accordance with some embodiments. Client synchronization service 156 may be implemented in the client device 150 of FIG. 1. However, in some embodiments, client synchronization service 156 may be implemented on another computing device. Client synchronization service 156 is configured to synchronize changes to objects between content management system 110 and the client device 150 on which client synchronization service 156 runs.

Client synchronization service 156 may include file system interface 205, server interface 210, tree storage 220, planner 225, and scheduler 230. Additional or alternative components may also be included.

File system interface 205 is configured to process changes to objects on local file system 270 of client device 150 and update local tree 250 or to make changes to local file system 270. For example, file system interface 205 can detect changes to objects in a monitored directory on local file system 270 of client device 150. Changes may also be made and detected via client application 152 of FIG. 1. File system interface 205 may make updates to local tree 250. The updates to local tree 250 may be made based on the changes (new, deleted, modified, copied, renamed, or moved objects) to objects on the client device.

Server interface 210 is configured to aid in the processing of remote changes to objects at content management system 110 and updating of remote tree 210. For example, server interface 210 can be in communication with server synchronization service 112 to synchronize changes to objects between client device 150 and content management system 110. Changes (new, deleted, modified, copied, renamed, or moved objects) to objects at content management system 110 may be detected and updates may be made to remote tree 210 to reflect the changes at content management system 110. Server interface 210 is also configured to aid in the communicating of local changes to objects at local file system 270 to server synchronization service 112 to update object database 148.

Tree storage 220 is configured to store and maintain the tree data structures used by client synchronization service 156. For example, tree storage 220 may store local tree 250, sync tree 235, and remote tree 210. In some embodiments, tree storage 220 may store the tree data structures in persistent memory (e.g., a hard disk or other secondary storage device) as well as in main memory (e.g., RAM or other primary storage device) in order to reduce latency and response time. For example, on start-up of the client device or client synchronization service 156, the tree data structures may be retrieved from persistent memory and loaded into main memory. Tree storage 220 may access and update the tree data structures on main memory and, before the client device or client synchronization service 156 is shut down, tree storage 220 may store the updated tree data structures in persistent memory.

Remote tree 210 represents a server state or the state of objects stored remotely from the client device (e.g., on a server of the content management system). Local tree 250 represents a file system state or the state of the corresponding objects stored locally on the client device. Sync tree 235 represents a merge base for the local tree and the remote tree. The merge base may be thought of as a common ancestor of the local tree and the remote tree or a last known synced state between the local tree and the remote tree.

Each tree data structure (e.g., remote tree 210, sync tree 235, or local tree 250) may include one or more nodes. Each node in a tree data structure may represent an object (e.g., a file, document, folder, etc.). Each node in a tree data structure may contain data such as, for example, a directory object identifier specifying the object identifier of a parent node of the object, an object name for the object, an object identifier for the object, and metadata for the object.

Planner 225 is configured to detect differences between the server state associated with content management system 110 and the file system state associated with the client device 150 based on the state of the tree data structures. For example, planner 225 may determine if there is a difference between remote tree 210 and sync tree 235. A difference between remote tree 210 and sync tree 235 indicates that an action performed remotely on one or more objects stored at content management system 110 has caused the server state and the file system state to become out of sync. Similarly, planner 225 may also determine if there is a difference between local tree 250 and the sync tree 235. A difference between local tree 250 and sync tree 235 indicates that an action performed locally on one or more objects stored in local file system 270 on client device 150 has caused the server state and the file system state to become out of sync. If a difference is detected, planner 225 generates a set of operations that synchronize the tree data structures.

In some scenarios, a set of operations generated based on a difference between the remote tree and the sync tree and a set of operations generated based on a difference between the local tree and the sync tree may conflict. Planner 225 may also be configured to merge the two sets of operations into a single merged plan of operations.

Scheduler 230 is configured to take the generated plan of operations and manage the execution of those operations. According to some embodiments, scheduler 230 converts each operation in the plan of operations into a series of one or more tasks that need to be executed in order to perform the operation. In some scenarios, some tasks may become outdated or no longer relevant. Scheduler 230 is configured to identify those tasks and cancel them.

When a difference exists between local tree 250 and sync tree 235, a change needs to be synchronized to content management system 110. To synchronize a change in local file system 270 to content management system 110, client synchronization service can commit an intent to server synchronization service 112 pertaining to specific synchronization operations. To commit the intent, client synchronization service 156 on client device 150 records an intent to commit an operation at client device 150. Client synchronization service 156 can record the intent to commit the operation durably on disk or memory at client device 150 to track the pending commit. Client device 150 can store dirty commit records and track modifications until an event triggers removal of the pending commit(s), such as a failure or success. Client synchronization service 156 also commits the operation to server synchronization service 112 by sending a message to server synchronization service 112 requesting to commit the operation.

Server synchronization service 112 can send a return message indicating whether the commit to content management system 110 succeeded or indicate an error. Only once client synchronization service 156 learns that the commit succeeded will client synchronization service 156 update remote tree 610 and sync tree 620 to include the synchronized operation and clear the intent to commit the operation from client device 150.

Client application 152 can learn of a change existing at a server by requesting information regarding events occurring on objects recorded in object database 148 since a last synchronization time known to the client device. In some embodiments, client synchronization service 156 makes a request for updated information periodically, or in response to receiving notifications about possible changes. When a change has occurred in the account at the content management system, server synchronization service 112 can send information about the operation that was performed to client synchronization service 156 which can update remote tree 215. Thereafter, client synchronization service 156 can detect a difference between remote tree 215 and sync tree 235 indicating that local file system 270 needs to be updated. Planner 225 can identify operations needed to update local file system 270, and server interface 210 can request any data, such as blocks making up objects, etc. from content management system 110.

Client synchronization service 156 can update local file system 270, local tree 250, and sync tree 235 to bring the system into a synchronized state. Additionally, client synchronization service 156 can store information identifying the synchronization time pertaining to the information received from object database 148 to indicate that client application is up to date to at least the last synchronization time. In some embodiments, the last synchronization time pertains to a row in object database 148, and can be stored as part of a cryptographically signed cursor that is received from content management system 110. The next time client synchronization service requests updated information, it will supply the cursor to identify a point in object database 148 from which to begin reading.

Anchor Object

In some embodiments, the content management system 110 can include functionality to generate an anchor object for an external directory that is external to a monitored directory on the client device 150. An anchor object is an object with special attributes. The client application 152 can recognize the anchor object as an object pointing to a directory that is external to a directory that is monitored by bi-directional client synchronization service 156. For example, FIG. 2 illustrates an anchor object 271 in a directory monitored by client synchronization service 156, where the anchor object 271 points to an external directory—external hard drive 151. While the anchor object 271 is illustrated as pointing to external hard drive 151 in FIG. 2, it should be appreciated that anchor object 271 can also point to other directories on client device 150 that are outside of the directory monitored by the bi-directional synchronization service 156.

By utilizing the anchor object, the content of the external directory represented by the anchor object can be synchronized to the content management system 110. In some embodiments, the anchor object can be associated with properties that instruct client synchronization service to synchronize the objects in the external directory directly without being first stored on the client device 150.

From the perspective of the content management system 110, the external directory represented by the anchor object can be treated as if the external directory were located within the directory that contains the anchor object. The anchor object can be stored as a directory in the monitored directory and can appear with objects located underneath it as illustrated in remote tree 215.

However, from the perspective of the client synchronization service 156, the anchor object has special attributes that change some characteristics about how it is represented in local tree 250 and sync tree 235 and can change some aspects of the synchronization of objects stored in the external directory. A representation of the monitored directory can be stored in a local tree structure 250 that represents a file system structure of objects in the monitored directory, including the anchor object 271. The anchor object 271 is represented in the local tree structure as a file or special object with a flag as part of the special attributes to indicate that it is an anchor object. Likewise, any objects under the anchor object might also appear in the local tree 250 or sync tree 235 with flags or special attributes to indicate that they are part of an external directory.

In some embodiments, the special attributes of the anchor object are extended attributes or ultimate data streams that describe attributes of an associated external directory. For example, the special attribute can be a Xattr that stores the location information of the associated external directory as a Binary Large Object (BLOB). The location information includes, but is not limited to a directory ID, an iNode reference, a device ID, an object ID, a unique ID (UUID), a target location, a path, etc. The special attributes can serve as a source of truth for the identification and location of the external directory and its corresponding contents.

In some embodiments, the client synchronization service 156 can recognize an anchor object by detecting the presence of its special attributes. After determining the object is a valid anchor object, the client synchronization service 156 can read the contents of the associated external directory indicated by the special attributes. Then, the client synchronization service 156 can communicate with the server synchronization service 112 to synchronize objects stored on the external directory to the content management system 110. Such synchronization of the external directory can occur periodically or when certain file events occur.

In some embodiments, the client synchronization service 156 can recognize the anchor object as being restricted to uni-directional synchronization. In such embodiments, the special attributes can identify an original source of the objects such that changes can be synchronized from the original source to the content management system, but client synchronization service 156 cannot write changes from the content management system 110 to the original source.

In some embodiments, whether the anchor object is restricted to uni-directional synchronization can be a function of whether the anchor object is stored within a directory that supports bi-directional synchronization, or a directory that is limited to uni-directional synchronization. For example, if the anchor object is located in a directory that is subject to bi-directional synchronization as part of a synchronization service, the directory to which the anchor object points may also receive bi-directional synchronization, if the directory to which the anchor object points can support bi-directional synchronization (some external directories cannot support bidirectional synchronization). However, if the anchor object is located in a directory for a backup service, which is only configured for uni-directional synchronization, then the directory to which the anchor object points is also subject to uni-directional synchronization regardless of whether the directory to which the anchor object points might support bi-directional synchronization.

Figure 3:
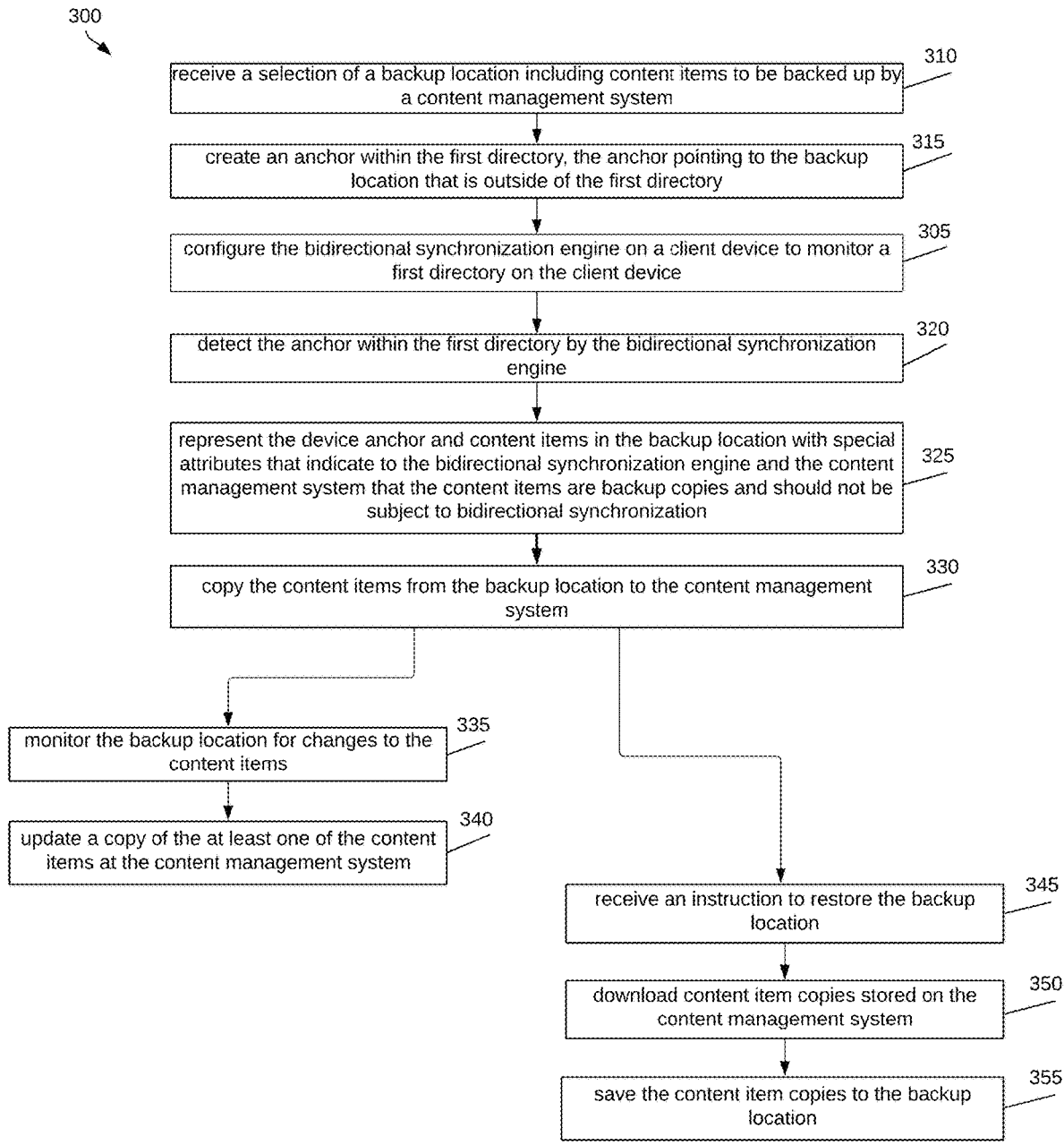
FIG. 3 is a flowchart of a method for using a bi-directional synchronization service of a content management system to provide an object backup service in accordance with some aspects of the present technology.

FIG. 3 illustrates an example method 300 for using a bi-directional synchronization service of a content management system to provide an object backup service. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some embodiments, the method includes receiving a selection of a backup location including objects to be backed up by a content management system at block 310. For example, the client application 152 may provide a user interface to allow a user to indicate that they would like to back up a directory or drive including objects to be backed up by a content management system. The client application 152 can receive a selection in the provided user interface.

When a user makes a selection of a backup location for the first time, in some embodiments, client application 152 can create a new directory—a first directory—to contain a reference, called an anchor, to any backup locations. According to some embodiments, the method includes creating the anchor within the first directory at block 315. The anchor points to the backup location that is outside of the first directory. For example, the client application 152 may create the anchor within the first directory. If the user selects other backup directories they can also be represented by an anchor stored within the first directory. In this way, the first directory serves as a location that includes a reference to all backup locations on or connected to client device 150.

Figure 6A:
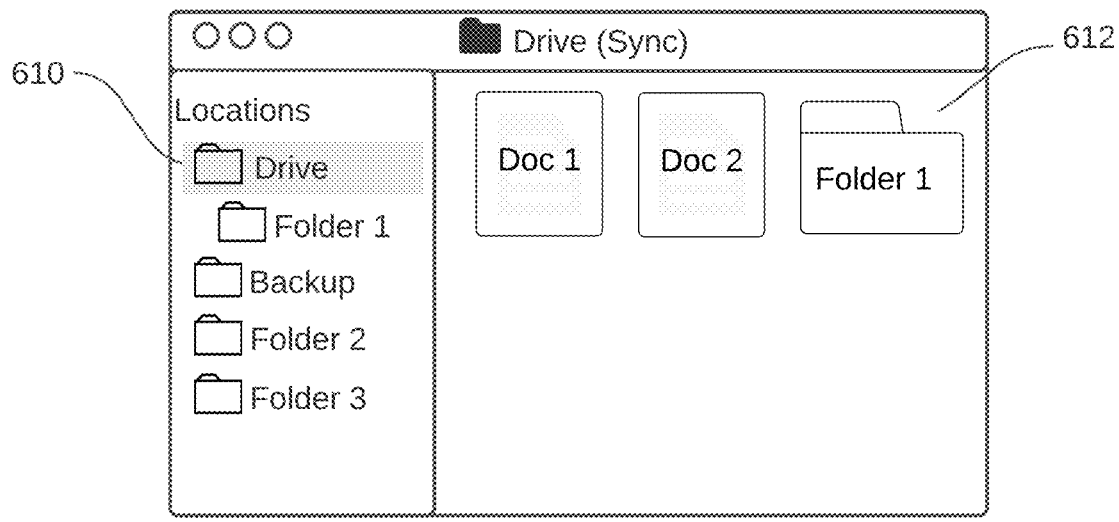
FIG. 6A and FIG. 6B are example user interfaces showing a file browsing interface with object organization within a file system of the client device, where the file system includes a synchronization directory and a backup directory in accordance with some aspects of the present technology.

One purpose for creating the first directory to include anchors for all backup locations is to separate backup locations from bi-directional synchronization locations. For example, as illustrated in FIG. 6A, a file browsing interface can distinguish the first directory (called Backups) for backups from a second directory (called Drive) containing objects subject to bidirectional synchronization. While it can be possible to represent an anchor object in a directory including objects subject to bidirectional synchronization, this can be confusing to a user and not provide a desirable user experience.

According to some embodiments, the method includes configuring the bidirectional synchronization service on a client device to monitor a first directory on the client device at block 305. For example, the client synchronization service 156 may configure synchronization service 156 to monitor a first directory on the client device where the first directory contains objects to be backed up.

In addition to creating the first directory to contain anchor objects for locations to be backed-up and a second directory to contain objects subject to bi-directional synchronization, in some embodiments, the client device can instantiate multiple instances of the bidirectional synchronization service 156, where a first instance of the bidirectional synchronization service is configured to watch the first directory, and a second instance of the bidirectional synchronization service is configured to watch a second directory. As noted above, the first directory contains objects to be backed up while the second directory includes objects for bidirectional synchronization. In some embodiments, the first directory and second directory should not be subordinate to one another. In other words, the first directory should not be in a path subordinate to the second directory, and the second directory should not be a path subordinate to the first directory. While the example pertains to a first and second directory and a first and second instance of bidirectional synchronization service, it should be appreciated that there can be any number of directory and bidirectional synchronization service instance combinations.

When client device 150 has instantiated multiple instances of the bidirectional synchronization service 156, the method can include limiting the first instance of the bidirectional synchronization service to a lower amount of network bandwidth than an amount of bandwidth permitted to be utilized by the second instance of the bidirectional synchronization service. For example, when the first instance of the bidirectional synchronization service 156 is used to monitor a directory with objects to be backed up and the second instance of the bidirectional synchronization service 156 is used to monitor objects that will be synchronized bidirectionally, it can be desirable to permit the second instance to utilize a greater portion of the existing bandwidth. This is because it may be assumed that items for backup are less likely to be needed immediately as the function of the backup is as an archive, whereas items that are synchronized bidirectionally are more likely to be actively used and shared. Additionally, the combination of instances can be configured to be limited to a total amount of bandwidth to ensure that the combination of instances does not monopolize all of the bandwidth for the client device 150.

According to some embodiments, the method includes detecting the anchor within the first directory by the bidirectional synchronization service at block 320. For example, the client synchronization service 156 may detect the anchor within the first directory.

According to some embodiments, the method includes representing the device anchor and objects in the backup location with special attributes that indicate to the bidirectional synchronization service and the content management system that the objects are backup copies and should not be subject to bidirectional synchronization at block 325. For example, the client synchronization service 156 may represent the device anchor and objects in the backup location with special attributes in tree storage 220 that indicate to the bidirectional synchronization service that the objects are backup copies and should not be subject to bidirectional synchronization. The special attributes associated with the device anchor and the objects in the backup location can also be transmitted to and stored by the content management system 110 to indicate that the objects are backup copies and should not be subject to bidirectional synchronization.

The use of these special attributes for unidirectional synchronization is optional. A device anchor can point to a location that should be subject to bi-directional synchronization. Additionally, in some embodiments, such as when a backed-up directory needs to be restored, the instance of the synchronization service can permit bidirectional synchronization in limited instances even when the special attribute indicating unidirectional synchronization is present.

According to some embodiments, the method includes copying the objects from the backup location to the content management system at block 330. For example, the client synchronization service 156 may copy the objects from the backup location to the content management system. In some embodiments, copying the objects from the backup location to the content management system is performed without copying the objects in the backup location to the first directory.

According to some embodiments, the method includes monitoring the backup location for changes to the objects at block 335. For example, the client synchronization service 156 may monitor the backup location for changes to the objects. While it is not anticipated that the backup location will be subject to frequent changes, it will happen that new objects are added to the backup location, or occasionally some objects might change. Accordingly, the present technology can utilize the functionality of the client synchronization service 156 to detect changes to content items to uni-directionally synchronize changes to the content management system 110.

In some embodiments, while the backup directory can benefit from uni-directional synchronization, the special attributes afforded to backup objects can be used to make sure that no backup objects are deleted, or at least, if a backup object is to be deleted, that the deletion is subject to additional layers of user confirmation. Specifically, the uni-directional synchronization must be subject to some limits because in order to preserve the backup purpose of the present technology it much not be possible to cause the backup copies on the content management system 110 to be deleted or corrupted when the original backup location is itself deleted or corrupted. This would defeat the purpose of having a backup. The backup copy would not be useful if it were subject to unlimited unidirectional synchronization such that when the source of the objects for backup were harmed, so too were the backed-up copies of the objects. Accordingly, the special attributes associated with the anchor object and the objects to which it points can be associated with rules or limitations.

Examples of such rules or limitations are a prohibition on deletions, deletions requiring confirmations, a limit or throttling on a number of object modifications that can happen during a period of time, a prohibition on modifications, modifications requiring confirmations, etc.

It should be appreciated that while such rules or limitations might be useful, they are not strictly needed to perform the backup function since the content management system can also provide a roll back feature to restore any object to a prior time. Accordingly, even if such rules or limitations were not used and an entire backup location were deleted, such backup location could still be restored from the content management system 110 by restoring the objects from a time prior to the deletion.

According to some embodiments, the method includes updating a copy of the at least one of the objects at the content management system after detecting a change to at least one of the objects in the backup location at block 340. For example, the client synchronization service 156 may update a copy of the at least one of the objects at the content management system after detecting a change to at least one of the objects in the backup location.

In addition to creating copies of objects and storing those objects in the cloud at content management system 110, occasionally a backup location needs to be restored, or a further copy of objects originating from the backup location needs to be made at another device.

In an instance where something has happened to the backup location, a feature of the present technology is to easily restore the backup location. According to some embodiments, the method includes receiving an instruction to restore the backup location at block 345. For example, content management system 110 may receive an instruction to restore the backup location.

According to some embodiments, the method includes downloading object copies stored on the content management system at block 350. For example, the client synchronization service 156 illustrated may download object copies stored on the content management system 110 and automatically save the object copies to the backup location at block 355. For example, since the client synchronization service 156 is a bi-directional synchronization service that is limited to uni-directional synchronization when performing the backup function, the client synchronization service 156 can utilized bi-directional synchronization capabilities to restore the object copies directly to their original location without the user having to manually download the object and copy the objects back to their original location.

Figure 4:
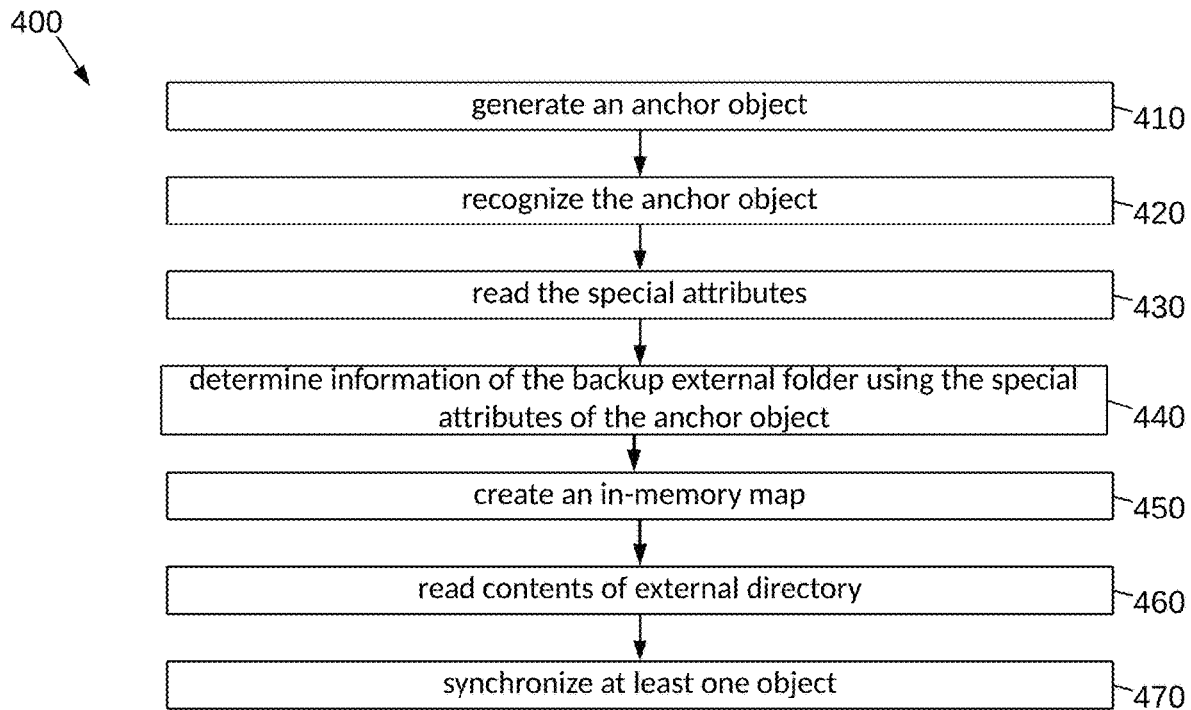
FIG. 4 is a flowchart of a method for utilizing an anchor object to provide the backup service in accordance with some aspects of the present technology.

FIG. 4 illustrates an example method 400 for generating an anchor object. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

At operation 410, the client application 152 may generate an anchor object for an external directory. As described above with regard to FIGS. 1 and 2, the anchor object is an object with special attributes, and a client application can recognize the anchor object as an object pointing to an external directory that is external to a directory that contains the anchor object. In this example, the client application treats the external directory as if the external directory were located within the directory that contains the anchor. The special attributes are extended attributes or ultimate data streams that describe attributes of the directory. The attributes of the directory include, but are not limited to a directory ID, an iNode reference, a device ID, an object ID, a UUID, a target location, a path, etc.

In some embodiments, the directory that stores the anchor is a directory that is monitored by the client synchronization service 156 and its contents are synchronized to a content management system.

At operation 420, the client synchronization service 156 may recognize the anchor object. In this example, the anchor object is recognized by the presence of the special attributes.

At operation 430, the client synchronization service 156 may read the special attributes of the anchor object. The client synchronization service 156 may read metadata pertaining to the contents of the backup directory and may process each object in the backup directory to convert the content of each object into hashed blocks.

At operation 440, a synchronization service 156 of the client application may determine information of the backup folder using the special attributes of the anchor object. For example, the client synchronization service 156 may determine the content, location information, or other information of the backup folder associated with the backup directory, using the special attributes of the anchor object.

At operation 450, the client synchronization service 156 may create an in-memory map for the backup directory based on the special attributes to convert between a device UUID of the backup directory to a content management system path in the local tree. The special attributes serve as a source of truth for the identification and location of the backup object.

At operation 460, the client synchronization service 156 may read the contents of the backup directory.

At operation 470, the client synchronization service 156 may synchronize at least one object on the backup directory to a content management system. In this example, the user can have options as to which objects should be synchronized and which objects should not be synchronized. In some embodiments, the synchronization of operation 460 is uni-directional from the backup directory to the content management system 110.

Figure 5:
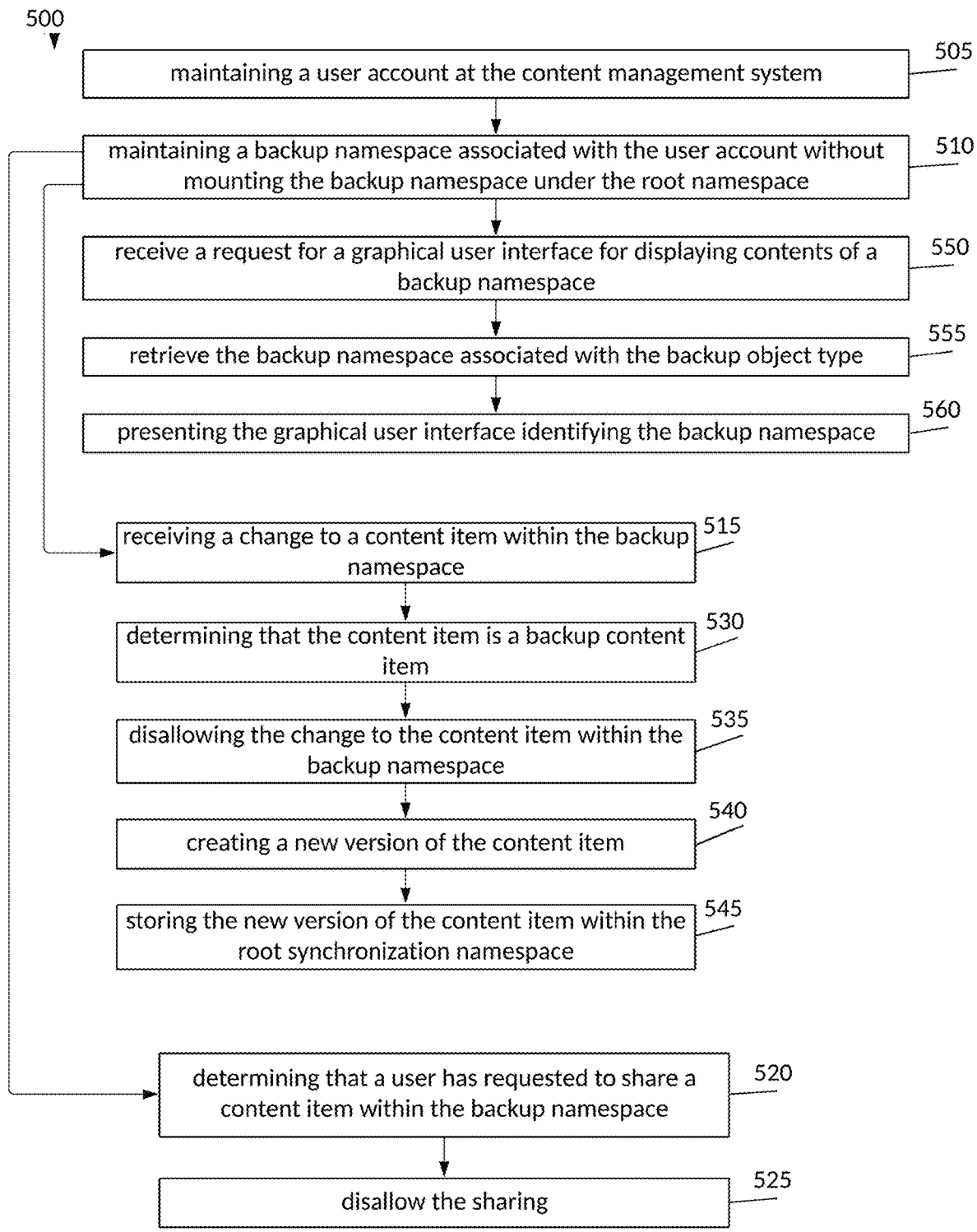
FIG. 5 is a flowchart of a method for displaying a backed up directory and maintaining a backup directory at the content management system in accordance with some aspects of the present technology.

FIG. 5 illustrates an example method 500 for displaying a backed-up directory and maintaining a backup directory at the content management system. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some embodiments, the method includes maintaining a user account at the content management system at block 505. For example, the content management system 110 may maintain a user account. In some embodiments, the user account is associated with a root synchronization namespace. In some embodiments, the user account is associated with a second synchronization namespace represented as a mount under the root synchronization namespace.

According to some embodiments, the method includes maintaining a backup namespace associated with the user account without mounting the backup namespace under the root synchronization namespace at block 510. For example, the content management system 110 may maintain a backup namespace associated with the user account without mounting the backup namespace under the root synchronization namespace which is used to provide bidirectional synchronization functions to the user account. In some embodiments, the specific backup location on the particular client device is indicated by an anchor object on the particular client device. At content management system 110 the anchor object is maintained as a backup namespace associated with user account, and is labeled as an anchor object type at the content management system. In some embodiments, the backup namespace is associated with an anchor object type. In some embodiments, the backup namespace represents a specific backup location on a particular client device including objects to be backed up by the content management system.

According to some embodiments, the method includes receiving a request for a graphical user interface for displaying contents of a backup namespace at block 550. For example, the content management system 110 may receive a request to provide a graphical user interface for display of contents of a backup namespace.

According to some embodiments, the method includes retrieving the backup namespace associated with the backup object type at block 555. For example, the content management system 110 may retrieve the backup namespace associated with the backup object type and the objects within the backup namespace.

According to some embodiments, the method includes presenting the graphical user interface identifying the backup namespace at block 560. For example, the content management system 110 may present the graphical user interface identifying the backup namespace and its contents.

User accounts may request to perform other interactions than displaying the contents of a backed-up directory, downloading a backed up copy on an object, or restoring a backup location (e.g., FIG. 3). In particular, user accounts might attempt to perform some actions that are not consistent with a backup. For example, back up objects should not be changed unless they are changed at the source of truth. In another example, back up objects may not be shared.

When content management system 110 may receive a change to an object within the backup namespace.

According to some embodiments, the method includes determining that the object is a backup object at block 530. For example, the content management system 110 may determine that the object is a backup object.

According to some embodiments, the method includes disallowing the change to the object within the backup namespace at block 535. For example, content management system 110 may disallow the change to the object within the backup namespace.

While a change to the object that is backed up is not allowed, in some embodiments the change can still be recorded at the content management system. According to some embodiments, the method includes creating a new version of the object at block 540. For example, content management system 110 may create a new version of the object.

Rather than storing the new version of the object in the backup namespace, according to some embodiments, the method includes storing the new version of the object within the root synchronization namespace for the user account at block 545. For example, content management system 110 may store the new version of the object within the root synchronization namespace for the user account. In this way, the backup namespace can be maintained as a backup that is only changed when a change occurs in the backed-up location via uni-directional synchronization from the backed-up location to the content management system. But the synchronization namespace is characterized by bi-directional synchronization, and this makes the synchronization namespace an acceptable location to store the new version of the object.

As introduced above, sharing of backed-up objects may be disallowed. According to some embodiments, the method includes determining that a user has requested to share an object within the backup namespace at block 520. For example, content management system 110 may determine that a user has requested to share an object within the backup namespace. In some cases, the character of the sharing might be relevant to whether the sharing of an object in a backup namespace is disallowed. For example, if the sharing request is to provide another user with a read-only copy of an object this might be acceptable, dependent on the configuration of backup service. However, if the sharing request is to provide an object that can be edited, this would be inconsistent with the properties of a backup service, and such sharing will either be disallowed or converted to read only access.

According to some embodiments, the method includes disallowing the sharing of the object with the backup namespace at block 525. For example, content management system 110 may disallow the sharing of the object with the backup namespace.

Figure 6B:
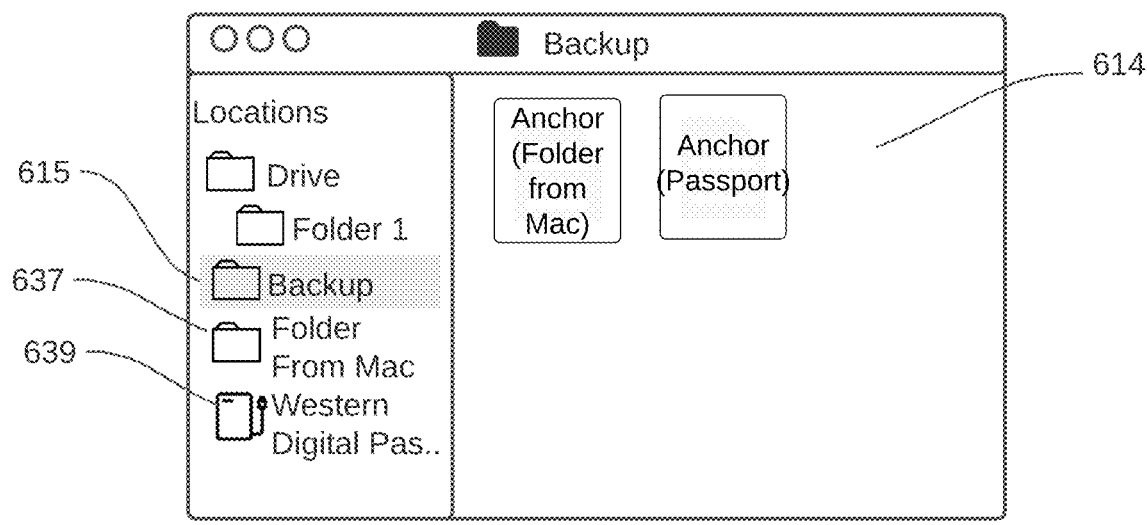

FIG. 6A and FIG. 6B illustrate example user interfaces on client device 150. As illustrated in FIG. 6A, client device 150 includes a synchronization directory 610 called "Drive." Synchronization directory 610 contains objects 612 such as document 1, document 2, and folder 1 that are synchronized with content management system 110.

As illustrated in FIG. 6B client device 150 also includes backup directory 615. Backup directory 615 includes objects 614 which are anchor objects. One of the anchor objects points to a folder from client device 150, which in this example is a Mac computer. The other of the anchor objects points to an external hard drive, which is a Western Digital Passport hard drive.

In the locations pane on the left of FIG. 6B, Folder 1 is indicated as being located as a subdirectory of the synchronization directory 610, but the folders from the Mac computer 637 and for Western Digital Passport hard drive 639 are not illustrated as being a subdirectory of the backup directory 615. This distinction is because Folder 1 is a subdirectory of synchronization directory 610, whereas the folder from the Mac computer 637 and the Western Digital Passport hard drive 639 are not subdirectories of backup folder 615. Rather FIG. 6B illustrates anchor objects 614 within backup directory 615. The anchor objects represent and point to the backup locations (Folder from Mac and Western Digital Passport) but those backup locations are not actually located in a directory subordinate to the backup folder.

Figure 7:
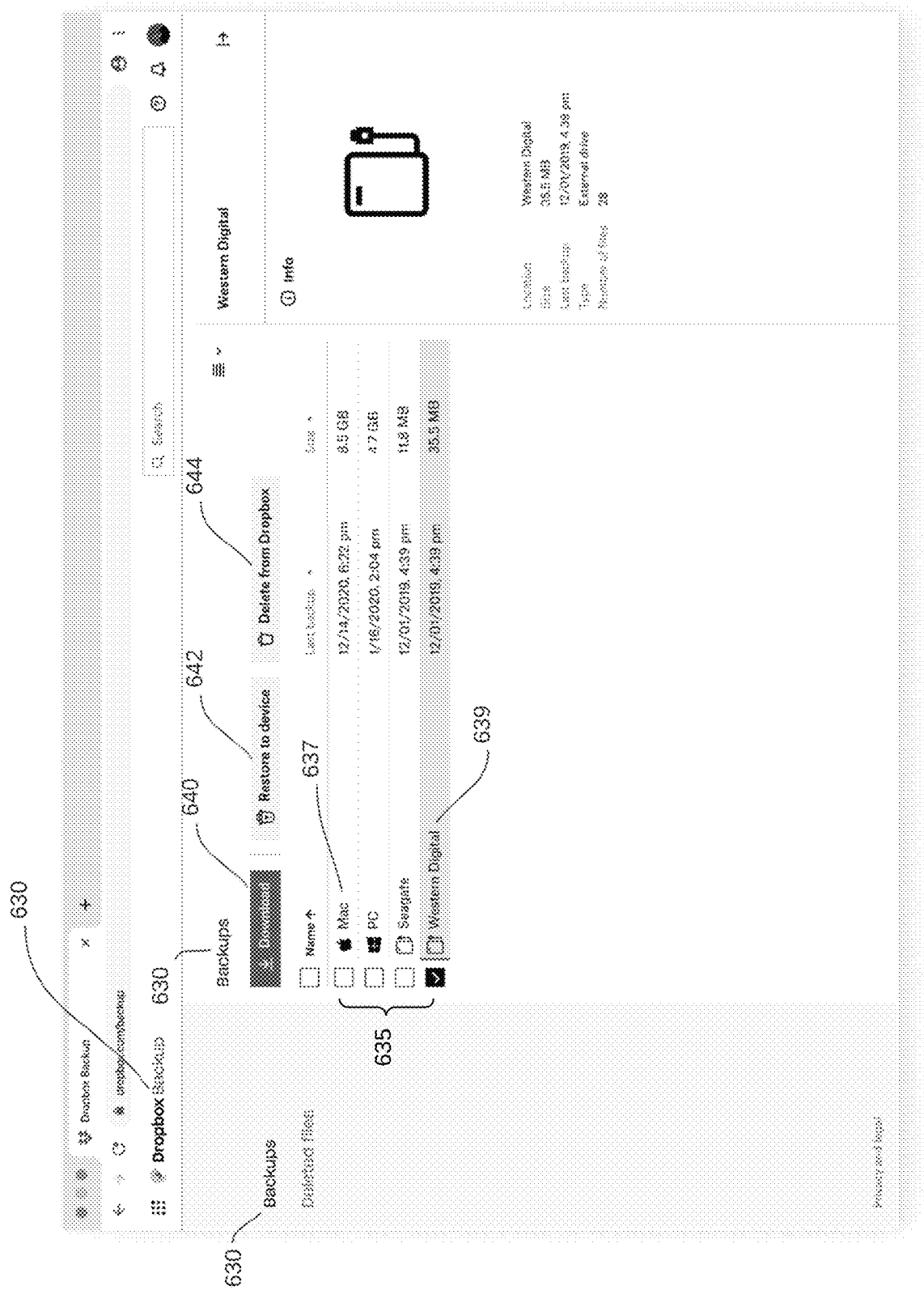
FIG. 7 illustrates an example user interface showing backed-up directories maintained by the content management system in accordance with some aspects of the present technology.

FIG. 7 illustrates a web page user interface provided by web interface service 124 of content management system 110. The web page user interface illustrates various indications that the webpage pertains to the backup service provided by content management system 110. For example, the web page user interface is labeled "Backup" 630 at several locations. The web page user interface illustrated in FIG. 7 shows all locations 635 being backed up by content management system 110, including locations associated with the client device illustrated in FIG. 6A and FIG. 6B (e.g., Folder of Mac 637, and Western Digital Passport hard drive 639).

The webpage user interface illustrated in FIG. 7 provides several functions to a user. One function is to download 640 the full or partial contents of any backup location. Another function is to restore 642 a back-up location. The restore 642 function allows content management system 110 to restore all objects backed up by content management system 110 to their original location at a particular client device 150. Another function is to delete 644 a backup location from being backed up by the backup service of content management system 110.

While FIG. 7 illustrates a web page user interface, it should be appreciated that the user interface could be presented by application 152 on client device 150.

Figure 8:
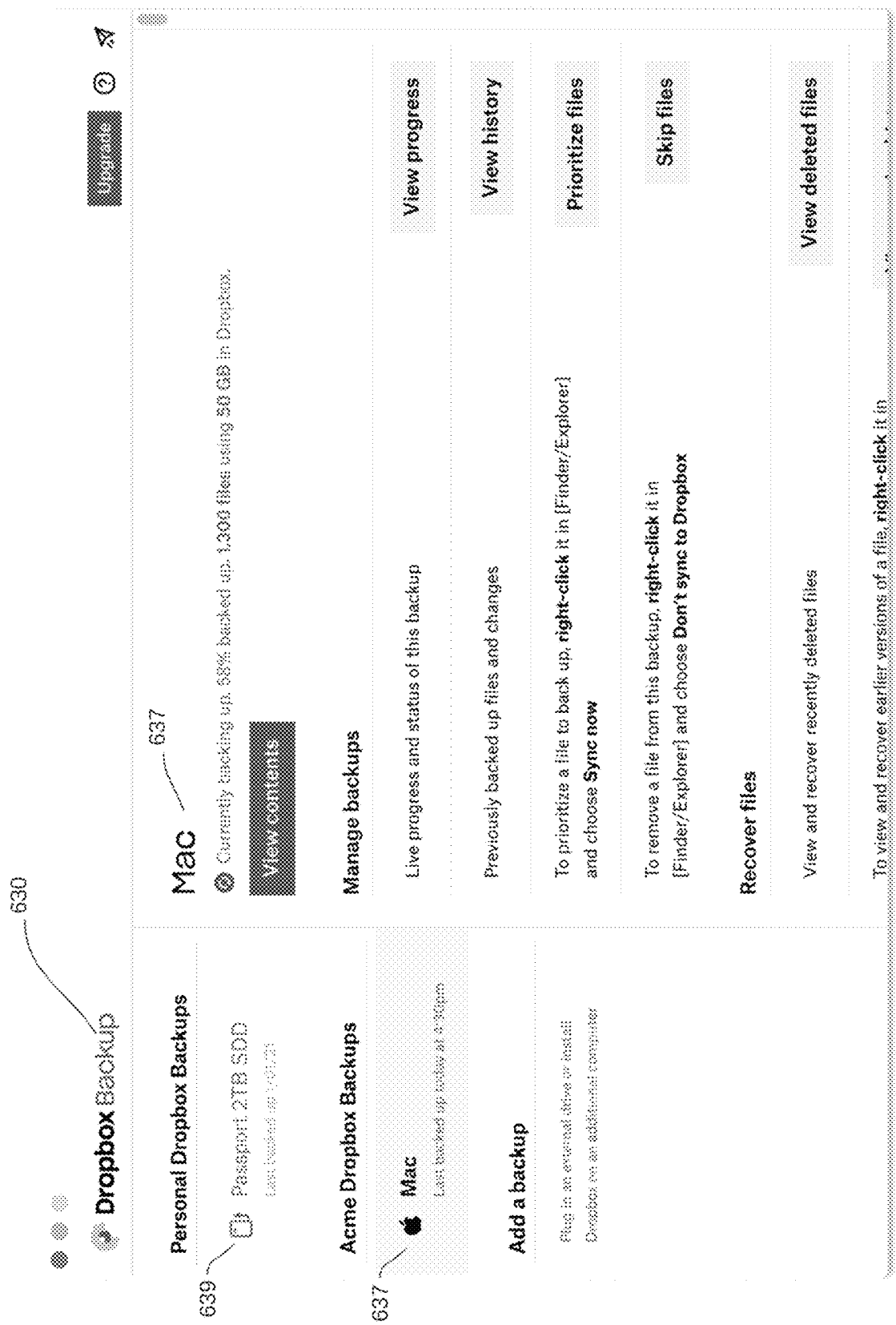
FIG. 8 illustrates an example user interface showing detailed information about a selected backed-up directory in accordance with some aspects of the present technology.

FIG. 8 illustrates a user interface that can be presented by a web page or client application 152 that can show detailed information about a particular backup location. For example, the user interface illustrated in FIG. 8 presents detailed information about the backup location from the Mac computer 637. This interface provides functions such as being able to view the contents that are backed up by content management system 110, and seeing the status of uploading objects to be backed up to content management system 110. Additionally the user interface illustrated in FIG. 8 can provide functions to manage the backups such as viewing the progress of a backup, viewing the history of previously backed up objects and changes to the objects, prioritizing an object to be backed up, removing the object from the backup, or choosing to not backup a particular object to the content management system 110. Additionally, the user interface illustrated in FIG. 8 can provide functions to recover objects. In some embodiments the full backup location can be restored, while in some embodiments it is possible to restore a particular object or a particular past version of an object.

Figure 9:
FIG. 9 illustrates an example user interface showing a status of a synchronization service and a backup service provided by the content management system in accordance with some aspects of the present technology.

FIG. 9 illustrates an example user interface from client application 152 on a mobile client device 150. User interface in FIG. 9 illustrates a differentiation between the synchronization service 610 (called "Drive" in the figure) and the backup service 615. Both the synchronization service 610 and the backup service 615 can be provided by content management system 110. The interface illustrated in FIG. 9 further provides more detailed information on the Mac computer 637 backup location and the Western Digital passport hard drive 639 backup location. While FIG. 9 illustrates an interface for a mobile application, the same or a similar interface can be presented by any computing device.

Figure 10:
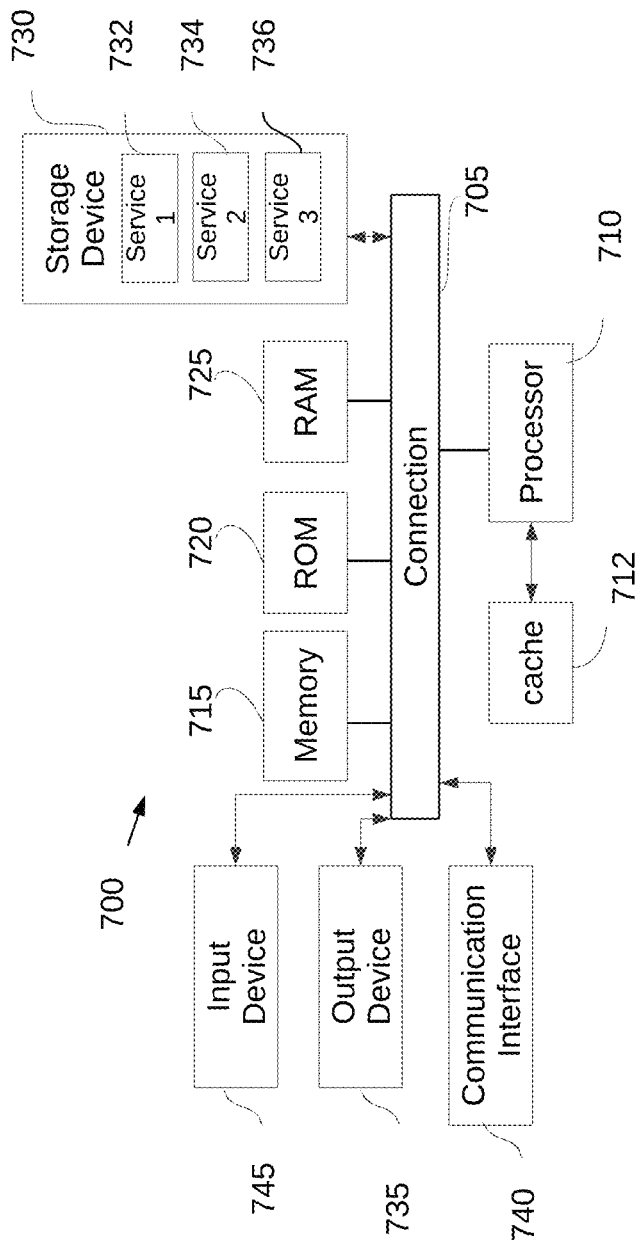
FIG. 10 illustrates an example computing system for implementing some aspects of the present technology.

FIG. 10 shows an example of computing system 700, which can be for example any computing device making up content management system 110 or client device 150, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement, and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A method of using a bi-directional synchronization service of a content management system to provide a object backup service, the method comprising: configuring the bidirectional synchronization service on a client device to monitor a first directory on the client device; receiving a selection of a backup location including objects to be backed up by a content management system; creating an anchor within the first directory, the anchor pointing to the backup location that is outside of the first directory; detecting the anchor within the first directory by the bidirectional synchronization service; and copying the objects from the backup location to the content management system.

Aspect 2: The method of Aspect 1, wherein the copying the objects from the backup location to the content management system is performed without copying the objects in the backup location to the first directory.

Aspect 3: The method of any of Aspects 1 to 2, comprising: representing the device anchor and objects in the backup location with special attributes that indicate to the bidirectional synchronization service and the content management system that the objects are backup copies and should not be subject to bidirectional synchronization.

Aspect 4: The method of any of Aspects 1 to 3, comprising: monitoring the backup location for changes to the objects; and after detecting a change to at least one of the objects in the backup location, updating a copy of the at least one of the objects at the content management system.

Aspect 5: The method of any of Aspects 1 to 4, comprising: wherein the bidirectional synchronization service occurs in a first instance of the bidirectional synchronization service that is configured to watch the first directory, and a second instance of the bidirectional synchronization service that is configured to watch a second directory, the second directory includes objects for bidirectional synchronization.

Aspect 6: The method of any of Aspects 1 to 5, comprising: limiting the first instance of the bidirectional synchronization service to a lower amount of network bandwidth than an amount of bandwidth permitted to be utilized by the second instance of the bidirectional synchronization service.

Aspect 7: The method of any of Aspects 1 to 6, comprising: receiving an instruction to restore the backup location; downloading object copies stored on the content management system; and saving the object copies to the backup location.

Aspect 8: A method for providing a synchronization service and a backup service by a client device, the method comprising: instantiating a first instance of a bidirectional synchronization service that is configured to monitor a backup directory, and a second instance of the bidirectional synchronization service that is configured to monitor a synchronization directory; copying objects from the backup directory to the content management system; and synchronizing objects from the synchronization directory to the content management system.

Aspect 9: The method of Aspect 8, wherein the backup directory includes an anchor, the anchor pointing to the backup location that is outside of the first directory.

Aspect 10: A method for providing a synchronization service and a backup service to a user account by a content management system, the method comprising: maintaining a user account at the content management system, wherein the user account is associated with a root synchronization namespace, and wherein the user account is associated with a second synchronization namespace represented as a mount under the root synchronization namespace; maintaining a backup namespace associated with the user account without mounting the backup namespace under the root namespace.

Aspect 11: The method of Aspect 10, wherein the backup namespace is associated with an anchor object type.

Aspect 12: The method of any of Aspects 10 to 11, comprising: receiving a request for a graphical user interface for displaying contents of a backup namespace; retrieving the backup namespace associated with the backup object type; and presenting the graphical user interface identifying the backup namespace.

Aspect 13: The method of any of Aspects 10 to 12, wherein the backup namespace is not associated with a parent namespace.

Aspect 14: The method of any of Aspects 10 to 13, wherein the backup namespace represents a specific backup location on a particular client device including objects to be backed up by the content management system.

Aspect 15: The method of any of Aspects 10 to 14, wherein the specific backup location on the particular client device is indicated by an anchor object on the particular client device, the anchor object being maintained as the backup namespace associated with user account, and being labeled as an anchor object type at the content management system.

Aspect 16: The method of any of Aspects 10 to 15, comprising: receiving a change to a object within the backup namespace, where the source of the change is from source other than the specific backup location on the particular client device; determining that the object is a backup object; disallowing the change to the object within the backup namespace; creating a new version of the object; and storing the new version of the object within the root synchronization namespace for the user account.

Aspect 17: The method of any of Aspects 10 to 16, comprising: determining that a user has requested to share a object within the backup namespace; and disallowing the sharing of the object with the backup namespace.

Aspect 18: A system for using a bi-directional synchronization service of a content management system to provide a object backup service, comprising: a storage configured to store instructions; a processor configured to execute the instructions and cause the processor to: configure the bidirectional synchronization service on a client device to monitor a first directory on the client device, receive a selection of a backup location including objects to be backed up by a content management system, create an anchor within the first directory, the anchor point to the backup location that is outside of the first directory, detect the anchor within the first directory by the bidirectional synchronization service, and copy the objects from the backup location to the content management system.

Aspect 19: The system of Aspect 18, wherein the copying the objects from the backup location to the content management system is performed without copying the objects in the backup location to the first directory.

Aspect 20: The system of any of Aspects 18 to 19, wherein the processor is configured to execute the instructions and cause the processor to: represent the device anchor and objects in the backup location with special attributes that indicate to the bidirectional synchronization service and the content management system that the objects are backup copies and should not be subject to bidirectional synchronization.

Aspect 21: The system of any of Aspects 18 to 20, wherein the processor is configured to execute the instructions and cause the processor to: monitor the backup location for changes to the objects; and after detect a change to at least one of the objects in the backup location, update a copy of the at least one of the objects at the content management system.

Aspect 22: The system of any of Aspects 18 to 21, wherein the bidirectional synchronization service occurs in a first instance of the bidirectional synchronization service that is configured to watch the first directory, and a second instance of the bidirectional synchronization service that is configured to watch a second directory, the second directory includes objects for bidirectional synchronization.

Aspect 23: The system of any of Aspects 18 to 22, wherein the processor is configured to execute the instructions and cause the processor to: limit the first instance of the bidirectional synchronization service to a lower amount of network bandwidth than an amount of bandwidth permitted to be utilized by the second instance of the bidirectional synchronization service.

Aspect 24: The system of any of Aspects 18 to 23, wherein the processor is configured to execute the instructions and cause the processor to: receive an instruction to restore the backup location; download object copies stored on the content management system; and save the object copies to the backup location.

What is claimed is:

1. A computer implemented method of providing object backup in a content management system with a bidirectional synchronization architecture, the method comprising:
   configuring a bidirectional synchronization service on a client device, by one or more processors, to monitor a first directory on the client device, wherein the bidirectional synchronization service occurs in a first instance of the bidirectional synchronization service that is configured to watch the first directory, wherein the first directory includes objects for backup, and wherein the bidirectional synchronization service occurs in a second instance of the bidirectional synchronization service that is configured to watch a second directory, the second directory includes objects for bidirectional synchronization;
   creating an anchor within the first directory, the anchor pointing to a backup location that is outside of the first directory, wherein the anchor is a special object that includes attributes that cause the bidirectional synchronization service to be restricted to uni-directional synchronization of the objects in the backup location;
   detecting the anchor within the first directory being associated with one or more of the objects for backup in the first directory by the bidirectional synchronization service; and based on the attributes, copying the objects from the backup location indicated by the anchor to the content management system.

2. The method of claim 1, wherein the copying the objects from the backup location to the content management system is performed without copying the objects in the backup location to the first directory.

3. The method of claim 1, comprising:
monitoring the backup location for changes to the objects; and
after detecting a change to at least one of the objects in the backup location, updating a copy of the at least one of the objects at the content management system.

4. The method of claim 1, comprising:
limiting the first instance of the bidirectional synchronization service to a lower amount of network bandwidth than an amount of bandwidth permitted to be utilized by the second instance of the bidirectional synchronization service.

5. The method of claim 1, comprising:
receiving an instruction to restore the backup location;
downloading object copies stored on the content management system; and
saving the object copies to the backup location.

6. A system for providing object backup in a content management system with a bidirectional synchronization architecture, comprising:
memory configured to store instructions; and
at least one processor configured to execute the instructions and cause the at least one processor to:
configure a bidirectional synchronization service on a client device to monitor a first directory on the client device, wherein the bidirectional synchronization service occurs in a first instance of the bidirectional synchronization service that is configured to watch the first directory, wherein the first directory includes objects for backup, and wherein the bidirectional synchronization service occurs in a second instance of the bidirectional synchronization service that is configured to watch a second directory, the second directory includes objects for bidirectional synchronization,
receive a selection of a backup location including objects to be backed up by the content management system,
create an anchor within the first directory, wherein the anchor points to a backup location that is outside of the first directory, wherein the anchor is a special object that includes attributes that cause the bidirectional synchronization service to be restricted to uni-directional synchronization of the objects in the backup location,
detect the anchor within the first directory being associated with one or more of the objects for backup in the first directory by the bidirectional synchronization service, and
based on the attributes, copy the objects from the backup location indicated by the anchor to the content management system.

7. The system of claim 6, wherein the at least one processor is configured to execute the instructions and cause the at least one processor to:
monitor the backup location for changes to the objects; and
after detecting a change to at least one of the objects in the backup location, update a copy of the at least one of the objects at the content management system.

8. The system of claim 6, wherein the at least one processor is configured to execute the instructions and cause the at least one processor to:
receive an instruction to restore the backup location;
download object copies stored on the content management system; and
save the object copies to the backup location.

9. A non-transitory computer-readable medium including instructions stored thereon, the instructions, when executed by a computing system, being effective to cause the computing system to:
configure a bidirectional synchronization service on a client device to monitor a first directory on the client device, wherein the bidirectional synchronization service occurs in a first instance of the bidirectional synchronization service that is configured to watch the first directory, wherein the first directory includes objects for backup, and wherein the bidirectional synchronization service occurs in a second instance of the bidirectional synchronization service that is configured to watch a second directory, the second directory includes objects for bidirectional synchronization;
create an anchor within the first directory, the anchor pointing to a backup location that is outside of the first directory, wherein the anchor is a special object that includes attributes that cause the bidirectional synchronization service to be restricted to uni-directional synchronization of the objects in the backup location;
detect the anchor within the first directory being associated with one or more of the objects for backup in the first directory by the bidirectional synchronization service; and
based on the attributes, copy the objects from the backup location indicated by the anchor to a content management system.

10. The non-transitory computer-readable medium of claim 9, wherein the copying the objects from the backup location to the content management system is performed without copying the objects in the backup location to the first directory.

11. The non-transitory computer-readable medium of claim 9, wherein the instructions, when executed by the computing system, being further effective to cause the computing system to:
monitor the backup location for changes to the objects; and
after detecting a change to at least one of the objects in the backup location, update a copy of the at least one of the objects at the content management system.

12. The non-transitory computer-readable medium of claim 9, wherein the instructions, when executed by the computing system, being further effective to cause the computing system to:
limit the first instance of the bidirectional synchronization service to a lower amount of network bandwidth than an amount of bandwidth permitted to be utilized by a second instance of the bidirectional synchronization service.

13. The non-transitory computer-readable medium of claim 9, wherein the instructions, when executed by the computing system, being further effective to cause the computing system to:
receive an instruction to restore the backup location;
download object copies stored on the content management system; and
save the object copies to the backup location.

* * * * *

UNITED STATES PATENT AND TRADEMARK OFFICE
CERTIFICATE OF CORRECTION

| | | |
|---|---|---|
| PATENT NO. | : 12,111,845 B2 | Page 1 of 1 |
| APPLICATION NO. | : 17/490225 | |
| DATED | : October 8, 2024 | |
| INVENTOR(S) | : Sourabh Yerfule et al. | |

It is certified that error appears in the above-identified patent and that said Letters Patent is hereby corrected as shown below:

In the Claims

Claim 6, Column 29, Line 28:
"memory configured to store instructions; and"

Should be corrected as follows:
"a memory configured to store instructions; and"

Signed and Sealed this
Fifth Day of November, 2024

Katherine Kelly Vidal
*Director of the United States Patent and Trademark Office*